Nov. 29, 1966 J. S. SMITH 3,288,336
TAPE TRANSPORT CONTROL SYSTEMS AND METHODS
Filed Oct. 5, 1964
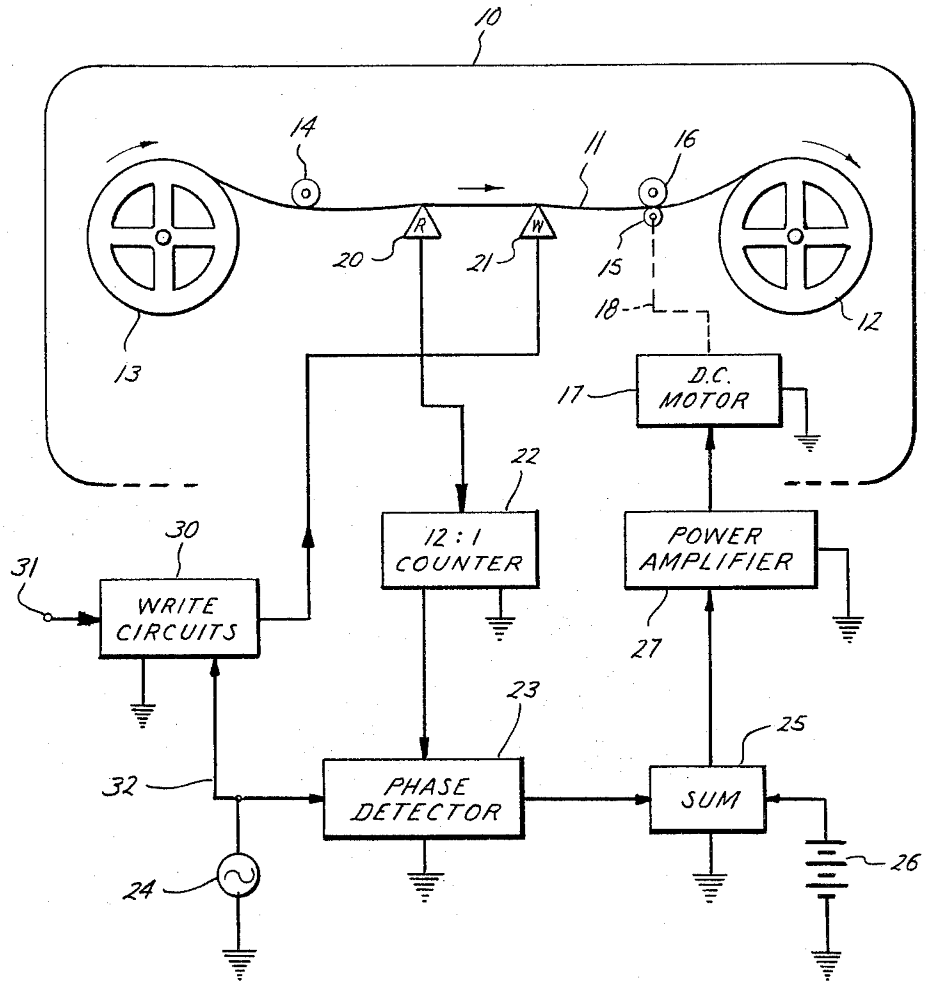
John S. Smith
INVENTOR.
BY Richard E. Bee
ATTORNEY

United States Patent Office 3,288,336
Patented Nov. 29, 1966

3,288,336
TAPE TRANSPORT CONTROL SYSTEMS AND METHODS

John S. Smith, Ridgefield, Conn., assignor to Schlumberger Well Surveying Corporation, Houston, Tex., a corporation of Texas Filed Oct. 5, 1964, Ser. No. 401,439
2 Claims. (Cl. 226—2)

This invention relates to tape transport control systems and methods for magnetic tape recorders.

It has heretofore been the practice for the case of tape recorders for recording digital data signals to use an alternating-current synchronous motor for diving the tape. The synchronous motor is driven by alternating current obtained from the power line. Consequently, the motor speed and, hence, the capstan speed is determined by the power line frequency. In order to insure uniform bit density for the digital signals recorded on the tape, it is customary to synchronize the bit rate or character rate of the data being written on the tape with the power line frequency. As a consequence, if the line frequency should vary, the data writing rate is varied in a corresponding manner so that the bit density on the tape remains constant.

In some data processing applications substantial advantages could be realized if a direct-current type of motor could be used in place of a synchronous motor. The use of a direct-current motor, however, would present problems in insuring a uniform bit density on the tape for the digital data to be recorded.

It is an object of the invention, therefore, to provide a new and improved tape transport control system which enables the use of a direct-current motor for driving the tape.

In accordance with one feature of the invention, there is provided a method of controlling a direct-current motor which is coupled to the tape transport mechanism of a magnetic tape recorder for purposes of driving such mechanism. The method includes pre-recording uniform magnetic reference marks along a length of a magnetic tape upon which data signals are to be recorded. When it is desired to record digital data signals, the pre-recorded tape is loaded on the tape transport mechanism and the direct-current motor is energized to advance the tape. As the tape advances, the pre-recorded reference marks are detected. The magnitude of the motor energizing voltage is then regulated to maintain the rate of detection of the pre-recorded reference marks at a desired value.

For a better understanding of the present invention, together with other and further objects and features thereof, reference is had to the following description taken in connection with the accompanying drawing, the scope of the invention being pointed out in the appended claims.

The single figure of the drawing shows in a diagrammatic manner a representative embodiment of a tape transport control system constructed in accordance with the present invention.

Referring to the drawing, there is shown a tape transport mechanism 10 for a magnetic tape recorder. The tape transport mechanism includes a magnetic recording tape 11 spooled between a take-up reel 12 and a supply reel 13. The tape passes over an idler wheel 14 and between a drive capstan 15 and a pressure roller 16. The rotary shaft of a direct-current motor 17 is direct coupled to the drive capstan 15, as indicated schematically by dash line 18. In passing from the supply reel 13 to the take-up reel 12, the magnetic tape 11 also passes over magnetic reading head means 20 and magnetic writing head means 21. The writing head means 21 are located on the downstream side of the reading head means 20.

In most digital data recording applications, it will be desired to record digital data bits in a side-by-side manner across the width of the tape 11 in several individual recording tracks which run parallel to one another along the length of the tape 11. In this case, the writing head means 21 will include a like number of individual writing heads located in a side-by-side manner across the width of the tape 11. Similarly, the reading head means 20 may include several individual reading heads located in a side-by-side manner across the width of the tape for individually detecting the data indications in each of the tracks. For purposes of explaining the present invention, however, it is sufficient if only a single reading head is used for detecting magnetic indications recorded in only a single one of the tracks on the tape 11.

The control system of the present embodiment also includes a twelve-to-one counter 22 which is responsive to the signal from the reading head means 20 for producing an output signal at one-twelfth the frequency of the input signal. This frequency-divided signal is supplied to a first input terminal of a phase detector 23. A periodic signal from a source 24 is supplied to a second input terminal of the phase detector 23. The source 24 is, for example, a 60-cycle alternating-current power line. The output of phase detector 23 is coupled to a first input of a summing circuit 25. A direct-current reference voltage from a battery 26 is supplied to a second input of the summing circuit 25. The resulting control signal at the output of summing circuit 25 is supplied to the input of a direct-current power amplifier 27 which, in turn, energizes the armature of the direct-current motor 17. As will be seen, the circuit 25 may instead be a difference circuit because the output signal from phase detector 23 will sometimes be of one polarity and sometimes of the other, thus, sometimes adding to and sometimes subtracting from the reference voltage supplied by battery 26.

The data signals which it is desired to record on the magnetic tape 11 are supplied to the writing head means 21 by write circuits 30. Write circuits 30 include appropriate circuits for processing signals applied to the input terminal 31 thereof and preparing them for recording on the tape 11. Appropriate synchronization is obtained from the 60-cycle power source 24 by way of conductor 32.

Considering now the operation of the tape transport control system just described, the purpose of the system is to synchronize the rate of movement of the magnetic recording tape 11 with the frequency of the power line source 24. Among other things, this enables the use of conventional synchronization methods for the write circuits 30.

In order to subsequently measure the rate or velocity of movement of the tape 11, the tape 11 is first run through a separate standard tape recorder of high accuracy and uniform, evenly spaced, magnetic reference marks are then recorded along the length of the tape. These reference marks are recorded with the same density as is desired for the data signal bit density. Thus, for a bit density of 200 bits per inch, the reference marks are recorded at the rate of 200 per inch. If only a single reading head is to be subsequently used, these reference marks need only be recorded in the tape track which will be sensed by such reading head.

After the reference marks have been pre-recorded on the tape 11, the tape is removed from the standard recorder and is ready for future use. When it is desired to record data signals on the tape, it is loaded onto the tape transport mechanism 10 of the present embodiment. Typically, the tape transport mechanism 10 will be part of a less elegant type of tape recorder intended for use in a rugged environment. After the pre-recorded tape is in place, the direct-current motor 17 is energized and the recording of data signals commences. For the present embodiment, it is assumed that the nominal recording speed for the tape 11 is 3.6 inches per second. Battery 26 is selected to provide a reference voltage which, when applied to the input of power amplifier 27, causes the motor 17 to drive the tape 11 at this nominal speed of 3.6 inches per second.

As the magnetic tape 11 moves past the reading head means 20, such reading head means operate to detect the pre-recorded reference marks on the tape 11. For a reference mark density of 200 marks per inch and a tape speed of 3.6 inches per second, there is produced at the output of the reading head means 20 a train of pulses at a rate of 720 pulses per second. These pulses are supplied to the counting input of the counter 22. In response thereto, counter 22 generates a squarewave output signal of one-twelfth the frequency, namely 60 cycles per second.

This 60-cycle squarewave signal is then compared with the 60-cycle power line signal by the phase detector 23. Phase detector 23 then produces an output error signal if the two input signals are not of the same frequency and phase. The direct-current component of this error signal may be of either positive or negative polarity, depending upon whether the output signal from counter 22 is lower or higher in frequency than the signal from the power line source 24. The error signal from phase detector 23 is supplied to the summing circuit 25 and combined with the reference voltage from battery 26. The resulting control signal is supplied to the power amplifier 27 which, in turn, drives the armature of the direct-current motor 17.

There is thus formed a feedback loop or a servo control for controlling the velocity of the tape 11. The polarities of the various circuit connections around the loop are such that if the velocity of the tape 11 is too great, then the error signal from phase detector 23 acts to reduce the speed of the motor 17. Conversely, if the speed is too small, then the error signal acts to increase the speed of the motor 17. In this manner the speed or velocity of the tape 11 is adjusted until it becomes proportional to the frequency of the periodic signal from the source 24. At this time, the error signal at the output of detector 23 assumes a minimum value.

Since the rate of occurrence of the detected reference marks is continually being compared with the power line frequency from source 24, if such power line frequency should vary, the resulting error signal from phase detector 23 will operate to adjust the speed of the tape 11 to maintain the desired proportionality between tape speed and line frequency. This enables the data signals which are, at the same time, being recorded on the tape 11 by the writing head means 21 to be provided with the desired bit density.

The use of pre-recorded reference marks on the tape 11 to control the velocity insures that it is the velocity of the tape itself which is regulated and not merely the velocity of the motor 17 or the capstan 15. Thus, no errors are introduced because of tape slippage and the like.

While there has been described what is at present considered to be the preferred embodiment of this invention, it will be obvious to those skilled in the art that various changes and modifications may be made therein without departing from the invention, and it is, therefore, intended to cover all such changes and modifications as fall within the true spirit and scope of the invention.

What is claimed is:

1. A tape transport control system for synchronizing the rate of movement of a magnetic recording tape with the variable frequency signal comprising:
   - tape transport means including capstan means for moving the magnetic tape;
   - direct-current motor means for driving the capstan means;
   - magnetic reading head means for detecting pre-recorded and evenly spaced magnetic reference marks on the tape;
   - circuit means for comparing the detected reference marks and the variable frequency signal for developing a control signal which is dependent on the degree of synchronization therebetween;
   - and circuit means for supplying the control signal to the direct-current motor means for controlling the speed thereof for rendering the rate of movement of the tape proportional to the frequency of the periodic signal.

2. A method of controlling a direct-current motor which is coupled to the tape transport mechanism of a magnetic tape recorder for purposes of driving same comprising:
   - pre-recording uniform and evenly spaced magnetic reference marks along a length of a magnetic tape;
   - loading the pre-recorded tape on the tape transport mechanism and energizing the direct-current motor for advancing the tape;
   - detecting the pre-recorded reference marks; comparing said evenly spaced magnetic reference marks with a variable frequency signal and developing a signal dependent on the degree of synchronization therebetween;
   - and regulating the magnitude of the motor energizing voltage for maintaining the rate of detection of the pre-recorded reference marks at a desired value.

References Cited by the Examiner

UNITED STATES PATENTS

| | | | |
|---|---|---|---|
| 2,774,927 | 12/1956 | Evans | 179—100.2 |
| 2,876,004 | 3/1959 | Sink | 179—100.2 |
| 2,963,555 | 12/1960 | Brubaker. | |
| 3,005,056 | 10/1961 | Goldmark et al. | |
| 3,179,752 | 4/1965 | Brenner. | |

M. HENSON WOOD, Jr., *Primary Examiner.*

J. N. ERLICH, *Assistant Examiner.*